(12) United States Patent
Lertrattanapanich et al.

(10) Patent No.: US 8,891,609 B2
(45) Date of Patent: Nov. 18, 2014

(54) SYSTEM AND METHOD FOR MEASURING BLOCKINESS LEVEL IN COMPRESSED DIGITAL VIDEO

(75) Inventors: Surapong Lertrattanapanich, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 600 days.

(21) Appl. No.: 12/410,285

(22) Filed: Mar. 24, 2009

(65) Prior Publication Data

US 2010/0246990 A1 Sep. 30, 2010

(51) Int. Cl.
| | | |
|---|---|---|
| H04N 11/04 | (2006.01) | |
| H04N 19/136 | (2014.01) | |
| H04N 19/86 | (2014.01) | |
| H04N 19/182 | (2014.01) | |
| H04N 19/189 | (2014.01) | |
| H04N 19/176 | (2014.01) | |
| H04N 19/117 | (2014.01) | |

(52) U.S. Cl.
CPC ....... *H04N 7/26888* (2013.01); *H04N 7/26127* (2013.01); *H04N 7/26255* (2013.01); *H04N 7/26313* (2013.01); *H04N 7/26244* (2013.01); *H04N 7/26058* (2013.01)
USPC ....... 375/240.01; 382/260; 382/261; 382/268

(58) Field of Classification Search
USPC ........ 348/222.1; 375/240.24, 240.27, 240.08; 382/260, 261, 264, 268, 275
See application file for complete search history.

(56) References Cited

U.S. PATENT DOCUMENTS

| | | | | |
|---|---|---|---|---|
| 5,832,105 A | * | 11/1998 | Morimoto et al. | 382/151 |
| 5,974,192 A | * | 10/1999 | Kundu | 382/260 |
| 7,944,588 B2 | * | 5/2011 | Yamada et al. | 358/3.27 |
| 2006/0244861 A1 | * | 11/2006 | Lertrattanapanich et al. | 348/448 |
| 2007/0058726 A1 | * | 3/2007 | Ha et al. | 375/240.24 |
| 2007/0071095 A1 | * | 3/2007 | Lim | 375/240.08 |
| 2007/0098294 A1 | * | 5/2007 | Xu et al. | 382/264 |
| 2007/0140590 A1 | * | 6/2007 | Kimura | 382/275 |

(Continued)

OTHER PUBLICATIONS

Pan F. et al., "A Locally-Adaptive Algorithm for Measuring Blocking Artifacts in Images and Videos" Circuits and Systems, 2004. ISCAS '04. Proceedings of the 2004 International Symposium on, May 2004, vol. 3 pp. 925-928.*

(Continued)

*Primary Examiner* — Thai Tran
*Assistant Examiner* — Stephen Smith
(74) *Attorney, Agent, or Firm* — IP Investment Law Group

(57) ABSTRACT

Embodiments include systems and methods of measuring a blockiness level in video data that has been encoded and decoded. In one embodiment, a Q-value is calculated that indicates the blockiness level of a decompressed image. The Q-value can be based on a block map having indicators corresponding to each of a plurality of pixels in an input image, each indicator signaling if a block edge is present at the corresponding pixel location in the input image, and also based on block locations indicative of the alignment block edge locations in the input image. The Q-value can be calculated in a vertical direction and a horizontal direction with respect to the input image. The Q-value is determined based on a flatness measurement of pixel values around certain considered pixels in the input image. The Q-value can be provided to a deblocking filter to improve the performance of deblocking the input image.

20 Claims, 13 Drawing Sheets

(56) References Cited

U.S. PATENT DOCUMENTS

| | | | |
|---|---|---|---|
| 2007/0280552 A1* | 12/2007 | Lee et al. | 382/268 |
| 2008/0002766 A1* | 1/2008 | Suwa et al. | 375/240.12 |
| 2008/0166060 A1* | 7/2008 | Lee et al. | 382/238 |
| 2008/0247664 A1* | 10/2008 | Lee et al. | 382/268 |
| 2010/0002953 A1* | 1/2010 | Kirenko et al. | 382/268 |
| 2010/0014596 A1* | 1/2010 | Bruton et al. | 375/240.27 |
| 2010/0033633 A1* | 2/2010 | Dane et al. | 348/625 |
| 2010/0060749 A1* | 3/2010 | Srinivasan et al. | 348/222.1 |
| 2010/0067817 A1* | 3/2010 | Winger | 382/256 |
| 2010/0142844 A1* | 6/2010 | Pereira et al. | 382/261 |

OTHER PUBLICATIONS

Vlachos, T., "Detection of blocked artifacts in compressed video", Electronic Letters, vol. 36, No. 13, pp. 1106-1108, Jun. 22, 2000.

Wang, Z. et al., "Blind Measurement of Blocking Artifacts in Images", ICIP, vol. 3, pp. 981-984, 2000.

* cited by examiner

| Region 1 | Region 2 | Region 3 | Region 4 |
| --- | --- | --- | --- |
| Region 5 | Region 6 | Region 7 | Region 8 |
| Region 9 | Region 10 | Region 11 | Region 12 |
| Region 13 | Region 14 | Region 15 | Region 16 |

FIGURE 9

SYSTEM AND METHOD FOR MEASURING BLOCKINESS LEVEL IN COMPRESSED DIGITAL VIDEO

RELATED APPLICATION

This application is related to co-owned application U.S. application Ser. No. 12/396,877, filed on Mar. 3, 2009, which is incorporated by reference in its entirety.

BACKGROUND OF THE INVENTION

1. Field of the Invention

This application relates to processing digital video, and more particularly to reducing artifacts in video due to data compression.

2. Description of the Related Technology

Processing and handling uncompressed digital video can require enormous resources. Uncompressed video requires vast amounts of space to store. Broadcasting uncompressed digital video requires a large bandwidth, and the digital video requires large amounts of electronic storage space at the recipient. Therefore, in almost all aspects of video processing, transmission, and storage, some type of video compression is utilized. Some forms of data compression are lossless, such that when the data is decompressed, the result is a bit-for-bit perfect match with the original. While lossless compression of video is possible, it is rarely used. Instead, lossy compression techniques are used because they result in far higher compression ratios at an acceptable level of quality, which is the point of video compression.

Video information may be organized within a frame or other video object (e.g., a video object plane (VOP)) in blocks. In some video encoding/decoding schemes, a block may include, for example a 2×2, 4×4, or 8×8 group of pixels, for example, "Y" luma pixels. Chroma (i.e., U/V, or Cr/Cb) pixels may be depicted in a similar block organization. Some encoding/decoding schemes further group blocks of pixel video information into macroblocks. If a digital image is overcompressed in a lossy manner, visible artifacts can appear. For example, when using quantization with block-based coding (for example, in JPEG-compressed images) several types of artifacts can appear, including "mosquito noise" around edges, and/or blockiness in "busy" regions (sometimes called quilting or checkerboarding). Video compression schemes (for example, MPEG-2, MPEG-4, H.264) may also yield artifacts such as blocking and noise especially around strong object edges in the subsequently uncompressed digital video. Certain video encoding/decoding schemes may employ a deblocking filter to smooth edges between adjacent blocks, thus improving the appearance of decoded video data. However, these deblocking filters assume prior knowledge of block size and/or offset and may also only operate on certain block sizes and offsets. Additionally, deblocking filters may not completely remove blockiness artifacts. Accordingly, a need exists for improved deblocking processing.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed. After considering this discussion, and particularly after reading the section entitled "Detailed Description of Certain Embodiments" one will understand how the features of this invention provide advantages that include allowing a video processor to calculate a Q-value that indicates the blockiness level of an input image, or regions thereof, the Q-value (along with block locations) being provided to a deblocking filter to improve the performance of deblocking the input image.

Some embodiments include a method of determining a Q-value that indicates the blockiness level of an input image, the method comprising receiving an input image comprising a plurality of pixels, receiving a binary block map that corresponds to an input image, the binary block map having indicators corresponding to each of the plurality of pixels in the input image, each indicator signaling if a block edge is present at the corresponding pixel location in the input image, receiving block locations indicative of the alignment block edge locations in the input image, for each considered pixel, in a selected area of the input image, that is aligned to a block edge location and having an indicator signaling the presence of a block edge, calculating a flatness measurement indicative of the flatness of the pixel values adjacent to said each considered pixel, averaging the calculated flatness measurements to determine a Q-value, the Q-value indicative of the blockiness level of the input image selected area, and providing the Q-value for use in deblocking the input image. In some embodiments the Q-value is provided directly to a deblocking filter. In some embodiments, the Q-value is provided indirectly to a deblocking filter, e.g., either provided to another component which provides it to a deblocking filter, or the Q-value is stored and then provided to a deblocking filter. In one aspect, the binary block map has an indicator signaling if a block edge is present at the corresponding pixel location in the input image in a first direction, the block locations are indicative of the alignment block edge locations in the input image in the first direction, the flatness measurement is indicative of the flatness of the pixel values adjacent to said each pixel in the first direction, and the Q-value is indicative of the blockiness level of the selected area in a first direction. The first direction may be horizontal with respect to the input image, or it may be vertical with respect to the input image. The selected area may include the entire input image. The selected area can also include a portion of the input image. The method can further comprise determining two or more regions of interest in the input image, calculating a Q-value for each of the two or more regions, and providing the Q-values for each of the two or more regions to a deblocking filter. Calculating a flatness measurement for each considered pixel can include extracting a set of pixels on opposite sides of the considered pixel forming a set of at least seven pixels, and calculating a flatness measurement based on the pixels values for the set of at least seven pixels. Calculating a flatness measurement for each considered pixel can include extracting a set of pixels on opposite sides of the considered pixel forming a set of at least twelve pixels, and calculating a flatness measurement based on the pixels values for the set of at least twelve pixels.

Some embodiments of a deblocking system include a block edge map generator configured to generate a block map of an input image, the block map comprising indicators corresponding to each pixel in the input image, the indicators signaling if a block edge exists at the corresponding pixel location in a first direction, a block edge locator configured to generate block edge locations for blocks in the input image in a first direction, and a Q-value estimator configured to receive the block map and the block locations, generate a Q-value indicative of the blockiness of the input image in the first direction based on the block map and the block locations, and provide the Q-value for use in deblocking the input image. The system can also include a deblocking filter configured to receive the Q-value, the block locations and the input image, and perform deblocking on the input image based on the block locations and the Q-value.

In some embodiments of a computer-program product for locating block edges in an image, the product comprises a computer-readable medium haying stored thereon codes executable by at least one processor to receive an input image comprising a plurality of pixels, receive a binary block map that corresponds to an input image, the binary block map having an indicator corresponding to each of the plurality of pixels in the input image, each indicator signaling if a block edge is present at the corresponding pixel location in the input image, receive block locations indicative of the alignment block edge locations in the input image, for each considered pixel, in a selected area of the input image, that is aligned to a block edge location and having an indicator signaling the presence of a block edge, calculate a flatness measurement indicative of the flatness of the pixel values adjacent to said each considered pixel, average the calculated flatness measurements to determine a Q-value, the Q-value indicative of the blockiness level of the input image selected area, and provide the Q-value to a deblocking filter for use in deblocking the input image.

In some embodiments, a system for locating block edges in an image, comprises means for receiving an input image comprising a plurality of pixels, means for receiving a binary block map that corresponds to an input image, the binary block map having an indicator corresponding to each of the plurality of pixels in the input image, each indicator signaling if a block edge is present at the corresponding pixel location in the input image, means for receiving block locations indicative of the alignment block edge locations in the input image, for each considered pixel, in a selected area of the input image, that is aligned to a block edge location and having an indicator signaling the presence of a block edge, means for calculating a flatness measurement indicative of the flatness of the pixel values adjacent to said each considered pixel, means for averaging the calculated flatness measurements to determine a Q-value, the Q-value indicative of the blockiness level of the input image selected area, and means for providing the Q-value to a deblocking filter for use in deblocking the input image.

BRIEF DESCRIPTION OF THE DRAWINGS

FIG. 9 illustrates an example of multiple regions (e.g., 4×4) that can be used for regional Q-value estimation.

DETAILED DESCRIPTION OF CERTAIN EMBODIMENTS

Figure 1:
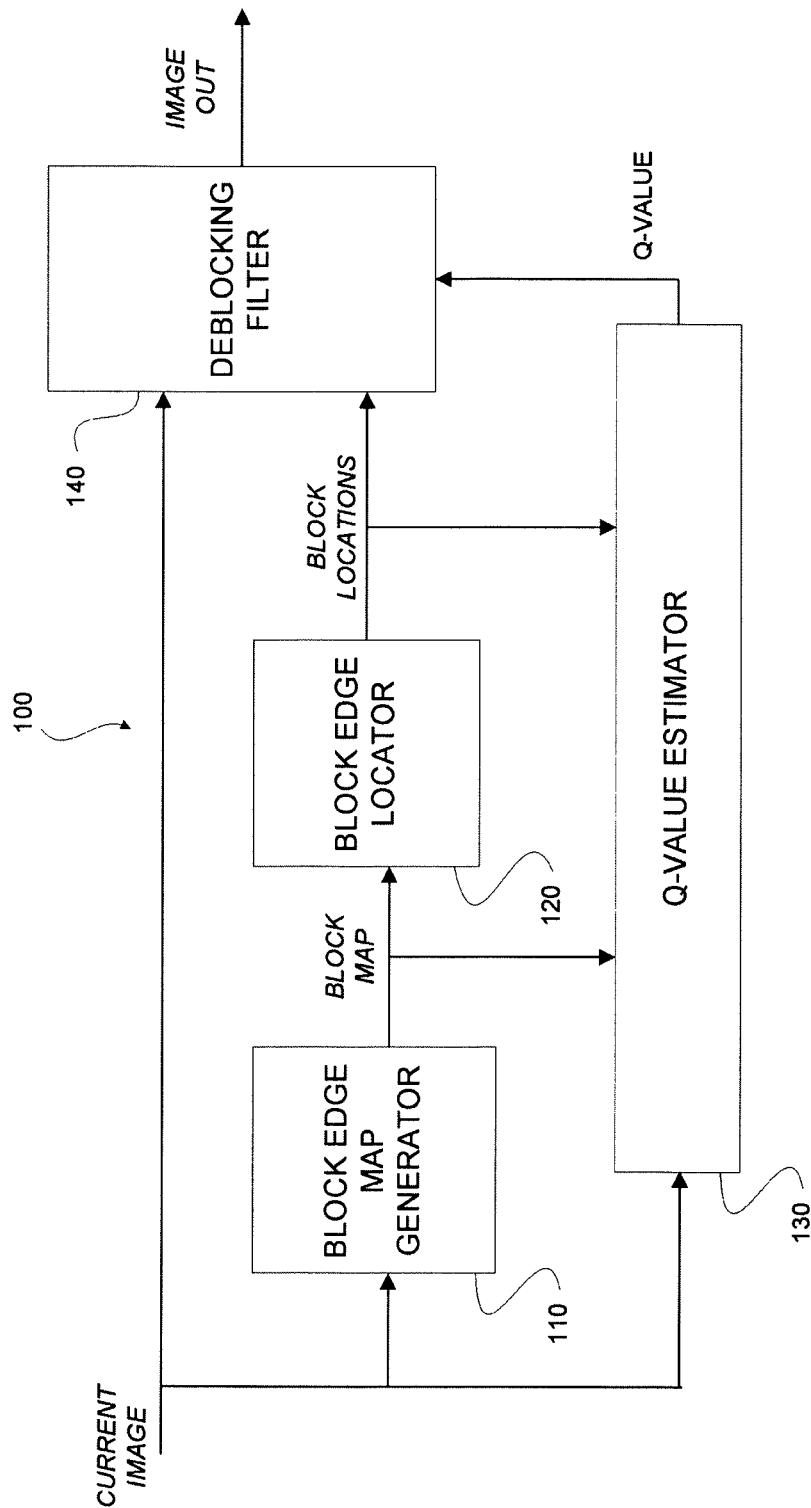
FIG. 1 is a block diagram illustrating components of one embodiment of a deblocking system.

The following detailed description is directed to certain specific system and method embodiments of the invention. However, the invention can also be embodied in a multitude of different ways. In this description, reference is made to the drawings wherein like parts are designated with like numerals throughout. The particular examples described herein, and the words "example" or "exemplary" when used herein, are for purposes of illustrating one or more embodiments and are not meant to limit the scope of the embodiments or the claims.

In various encoding/decoding schemes, digital video can be cropped or resized to suitable resolution before it is viewed on a television or other multimedia system. This can result in shifting the block edge location offset (block offset) and distance between adjacent block edge locations (block size). For example, in some embodiments the resizing scheme could be one of the following: (1) standard definition (720× 480) ("SD") to high definition (1336×768) ("HD"); (2) SD to full high definition (1920×1080) ("FHD"); (3) HD to FHD; (4) overscanned×1.2H/V (upscaled by scaling ratio of 1.2 in both horizontally and vertically); (5) underscanned×0.8H/V (downscaled by scaling ratio of 0.8 in both horizontally and vertically); and (6) any scaling ratio. Accordingly, after image decompression the block edge locations may not be known.

For some non-scaled video, block edges may be located 8 pixels apart in the horizontal (width) and vertical (height) direction, and the offset of block edge locations with respect to the upper left corner of video may be zero (0) in both the horizontal and vertical direction. Accordingly, this can be referred to as block size 8×8 and block offset (0, 0). By resizing the video, the block size, and the block edge locations, also changes accordingly. For example, for the SD to FHD case, where a standard definition 8×8 block size can be re-sized to full high definition block, the resized block size becomes 21.3333×18 (i.e., 1920/720*8=21.3333; 1080/ 480*8=18). For a standard definition case where a SD 8×8 block size is overscanned, the new block size becomes 9.6× 9.6 (i.e., 8*1.2=9.6). If the video is cropped, the block offset may not start at (0, 0).

FIG. 1 is a block diagram illustrating components of a deblocking system 100, according to one embodiment. Various embodiments of block edge locators can determine the block edge locations (block boundaries) in video so that a subsequently applied deblocking algorithm can reduce blocking artifacts. One embodiment of such a block edge locator is described below in reference to FIGS. 2-8B. Such embodiments require no prior knowledge of block size and offset; instead, they can be estimated without such knowledge.

Additional information relating to the blockiness level of the data, also referred to herein as "Q-value," can also be provided to a deblocking filter to further control the deblocking filter and improve its performance. The Q-value is determined based in part on a provided block map and block locations. The blockiness level of compressed video is called Q-Value because it is related to the quantization matrix used for quantizing the DCT coefficients in the block-based video coding scheme such as H.261, H.263, MPEG-1, MPEG-2, and MPEG-4. Generally, the higher the Q-Value is, the more video will be compressed, and the blockier the video will be. A Q-value can be calculated from one or more regions of an image or for an entire image. Also, a Q-value can take into account many local statistics of an input image such as mean, standard deviation, and the number of sign changes of a set of pixels when each pixel value is evaluated against the mean of the pixels in the set. In some embodiments, estimating the Q-value may be performed only for pixels that are determined to be block edge pixels. Certain method and system embodiments of measuring the blockiness level of compressed video and providing a Q-Value to a deblocking filter to enhance its performance are described herein.

Still referring to FIG. 1, a deblocking system 100 can include a block edge map generator 110, block edge locator 120 and a Q-value estimator 130. The block edge map generator 110 generates a block map, and provides the block map to the block edge locator 120 and the Q-value estimator 130. The block edge locator 120 uses the block map to determine block locations and provides the block locations to the Q-value estimator 130 and a deblocking filter 140. A current (or input) image is also provided to the block edge map generator 110, the deblocking filter 140, and the Q-Value estimator 130. In some embodiments (not shown), the Q-value estimator 130 can receive the block edge locations directly from a video decoder. The Q-value estimator 130 determines a Q-value relating to blockiness level of the entire current image or a part (or region) of the current image, and provides the Q-value to the deblocking filter 140. The current image can also be provided to the deblocking filter 140 for deblocking in both the horizontal and vertical directions. The deblocking filter 140 can manipulate the pixel data of the current image in the regions of the identified horizontal and vertical block edges using one or more of a variety of smoothing schemes, and produce an output image which exhibits less blockiness than the original current image The input image can be an image that was previously subject to data encoding and decoding (for example, MPEG-2, MPEG-4, or H.264) or other data manipulation schemes including, for example, resizing, scaling, overscanning or underscanning. However, the block edge locations and/or block size of the input image may not be known. The deblocking system 100 can be implemented on a variety of computer, communication, or display systems, including but not limited to televisions or multimedia components of an entertainment system.

The deblocking system 100 can perform deblocking in both the horizontal (e.g., along a x-direction of the current input image) and vertical (e.g., along a y-direction of the current image). For horizontal deblocking, the block edge map generator 110 generates a horizontal block map of the current image. The block edge locator 120 used the horizontal block map to produce block locations for the horizontal direction. A horizontal Q-value is determined from the horizontal block map and the horizontal block locations. The current image, the horizontal block locations of the current image, and the horizontal Q-value are provided to the deblocking filter 140, which performs horizontal deblocking of the current image. To address vertical blockiness of the current image, the block edge map generator 110 produces a vertical block map which is used by the block edge locator 120 to produce block locations in the vertical direction. A vertical Q-value is determined from the vertical block map and the vertical block locations. The current image, the vertical block locations of the current image, and the vertical Q-value are provided to the deblocking filter 140, which performs vertical deblocking of the current image. Accordingly, the "block map," "block locations," and "Q-value" illustrated in FIG. 1 are representative of a vertical and horizontal block map, block locations, and Q-values.

The deblocking system 100 can identify block edge locations in both the vertical and horizontal directions, and perform deblocking of the current image for both vertical and horizontal block edges. The methods and systems described herein to identify the vertical and horizontal block map, the block locations, and the Q-value are similar. Accordingly, description herein pertaining to determining block maps, block edge locations and Q-values in the horizontal direction also directly pertains to determining block maps, block edge locations and Q-values in the vertical direction, unless otherwise stated. To obviate redundancy of the disclosure, embodiments of methods and systems of deblocking and generating a Q-value for use by a deblocking filter will described in particular with reference to these operations in horizontal directional; however, one of skill in the art will understand the same methods and systems can be equally applied to determining a Q-value and performing deblocking in the vertical direction (unless otherwise stated).

Figure 2:
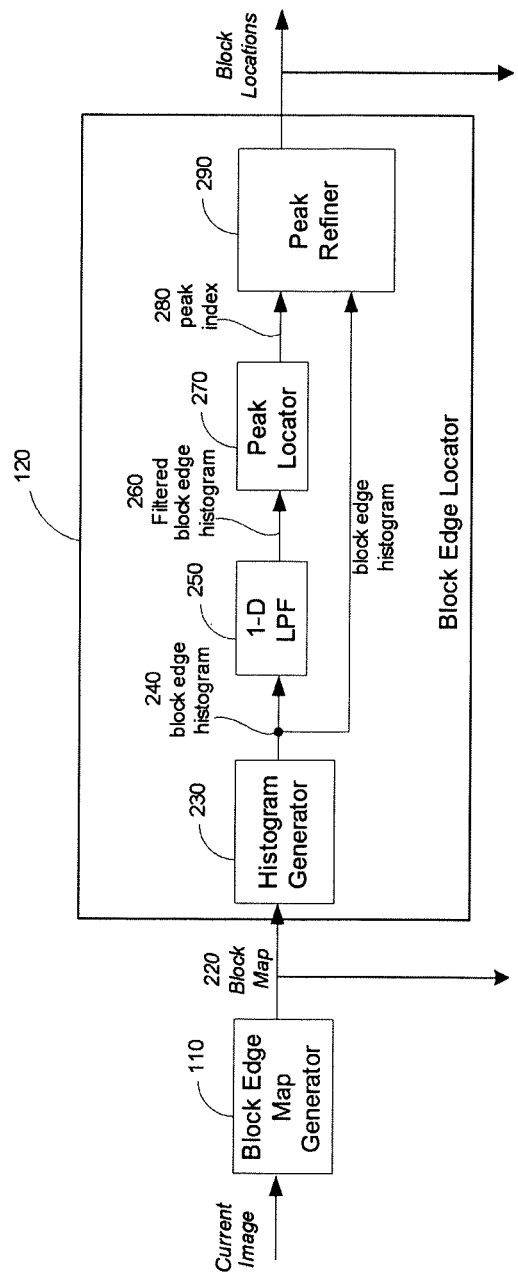
FIG. 2 is a block diagram illustrating one embodiment of components that can be used to generate a block map and block locations, which can be provided to measure a blockiness level (or Q-value).

FIG. 2 illustrates one embodiment of a block edge map generator 110 and a block edge locator 120, that can be used to provide a block map and block locations to a Q-value estimator 130 in the deblocking system 100 illustrated in FIG. 1. Other suitable block map generators and block edge locators can also be used if they are also configured to provide suitable block maps and block locations. Such block map generators and block edge locators (e.g., components or modules) can be implemented in hardware or software (including firmware), or a combination of both, according to different embodiments. As shown in FIG. 2, the block edge histogram generator 110 receives a current image, generates a block map, and provides the block map to the block edge locator 120 and to the Q-value estimator 130 (FIG. 1). The block edge map generator 110 can receive a component of the current image, in this example a luminance component. The block edge map generator 110 produces a "block map" representation of the input image. A histogram generator 230 in the block edge locator 120 receives the block map and generates a block edge histogram 240. When the block edge locator 120 performs horizontal block edge location, the resulting horizontal block edge histogram depicts a series of peaks that indicate locations of block edges in the horizontal or x-direction of the block map, e.g., vertically aligned block edges along the horizontal or x-dimension of an image. When the block edge locator 120 is run vertically, the resulting vertical block edge histogram illustrates a series of peaks that indicate locations of block edges in the vertical or y-direction of the block map, e.g., horizontally aligned block edges along the vertical or y-direction of an image. The block edge locator 120 may also include a one dimensional (1-D) filter 250, for example a low pass filter ("LPF"). This filtering can be implemented in hardware or software. The 1-D LPF 250 can smooth the block edge histogram 240 to produce a filtered block edge histogram 260. A peak locator 270 can receive the filtered block edge histogram 260 and determine its peak location. This information may be stored in peak index 280. The filtered block edge histogram 260 can be used by the peak locator 270 instead of unfiltered block edge histogram 240 to avoid false detection caused by spurious peaks that may be present in the unfiltered block edge histogram 240. The peak index 280 can be provided to a peak refiner 290. The peak refiner 290 is configured to receive the block edge histogram 240. Because the peak index 280 is obtained using the filtered block edge histogram 260, the identified peak locations (e.g., move the peak locations) in filtered block edge histogram 260 may not exactly coincide with the actual peaks of the block edge histogram 240. Accordingly, the peak refiner 290 can refine the peak locations to make sure the identified peaks in peak index 280 coincide with the locations of the peaks in the block edge histogram 240. The block edge locator 120 provides the block locations to the Q-value estimator 130 (FIG. 1) and the deblocking filter 140 (FIG. 1).

Figure 3:
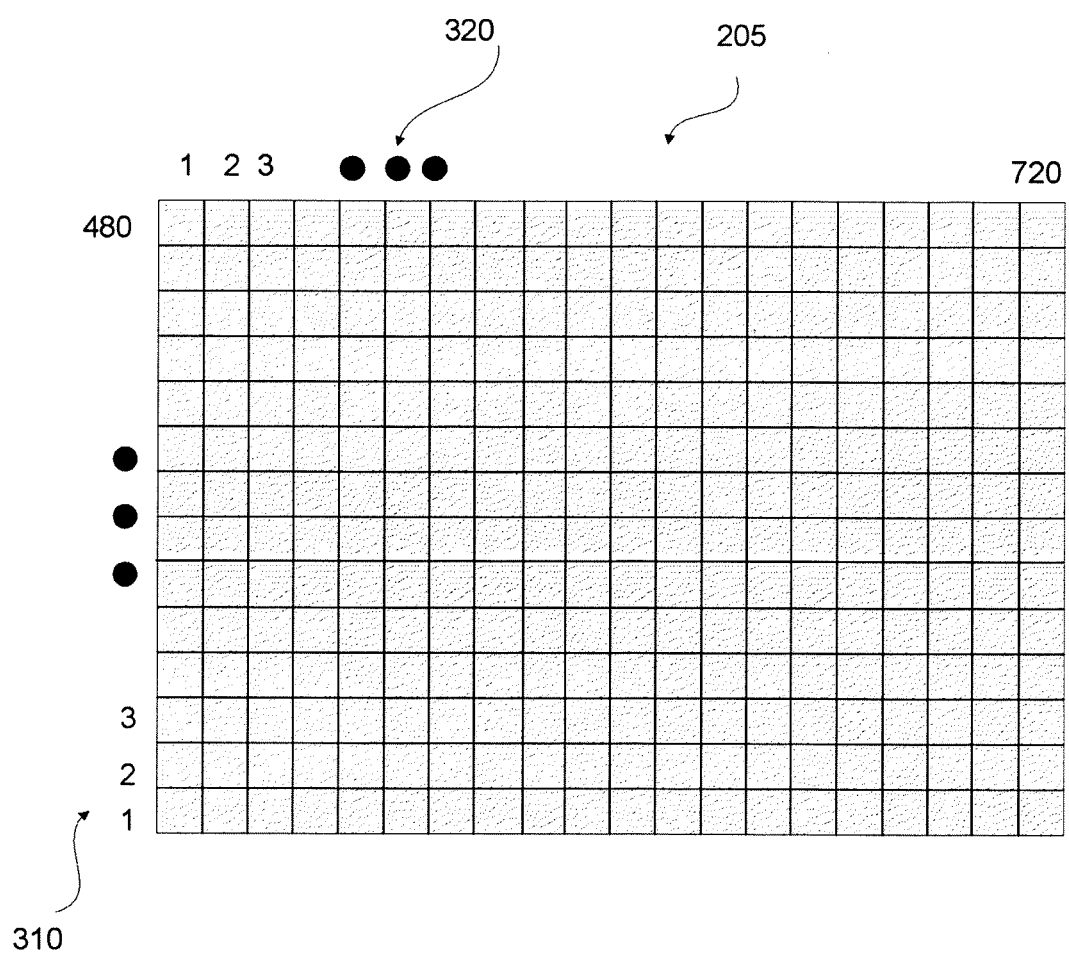
FIG. 3 is a schematic illustrating an example of luminance data input to a block edge map generator illustrated in FIG. 2.

FIGS. 3-7 further illustrate certain aspects of generating a block map which is the provided to the Q-value estimator 130, according to one embodiment. FIG. 3 is a schematic illustrating a representation of an input image luminance component 205 received by the block edge map generator 110. The input image luminance component 205, in this example, is a standard definition frame with a vertical size of 480 rows (pixels) 310 illustrated along the left hand edge of the input image 205, and a horizontal size of 720 columns (pixels) 320 (e.g., 720×480) illustrated along the top edge of the input image 205.

Figure 4:
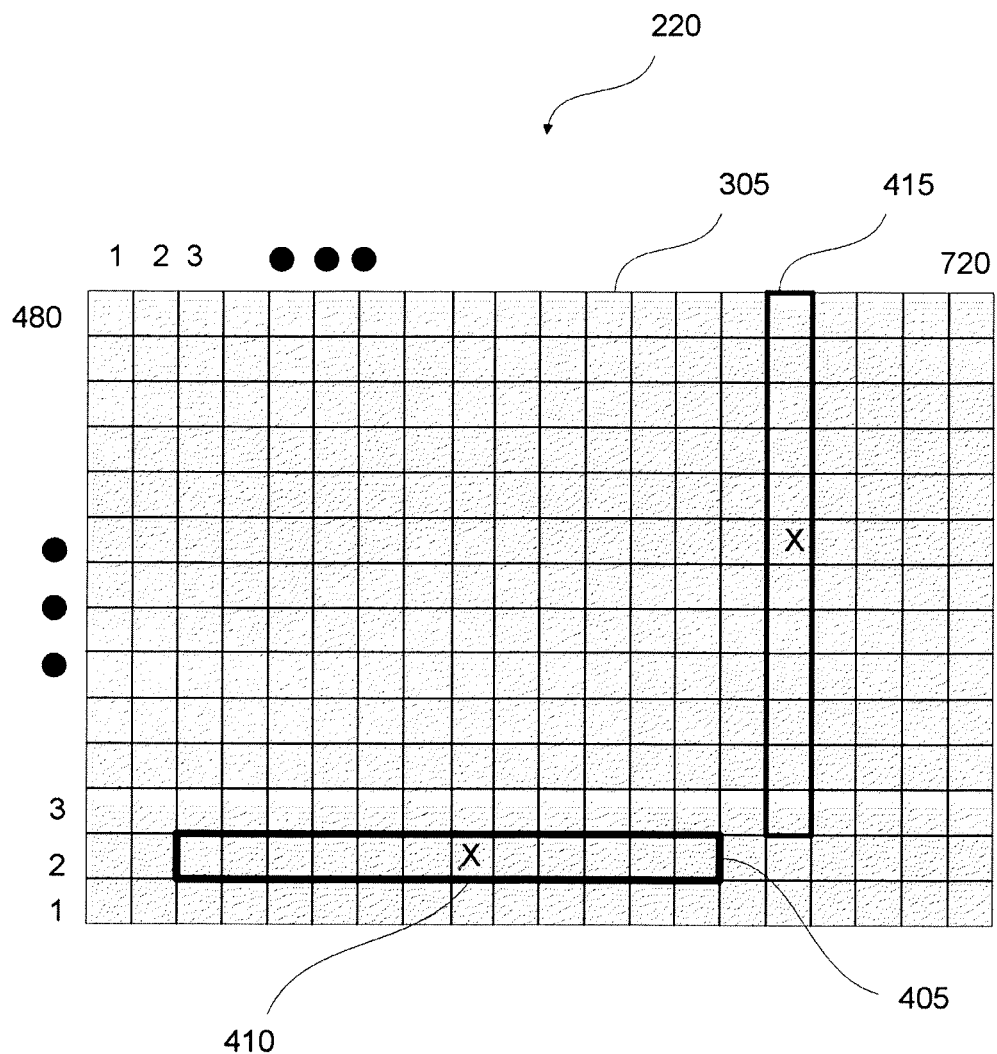
FIG. 4 is a schematic illustrating an example of a set of pixels extracted in a horizontal and a vertical direction from input data, the set of pixels including a considered pixel and neighbor pixels.

As illustrated in FIG. 4, for horizontal block edge locations for a plurality of pixels, the block edge map generator 110 extracts a set of pixels 405 from the input image 205. FIG. 4 shows an exemplary set of pixels 405, including a considered pixel 410 and its neighbors. For vertical block edge locations, an extraction of a set of pixels 415 can be extracted in a similar manner but vertically.

Figure 5:
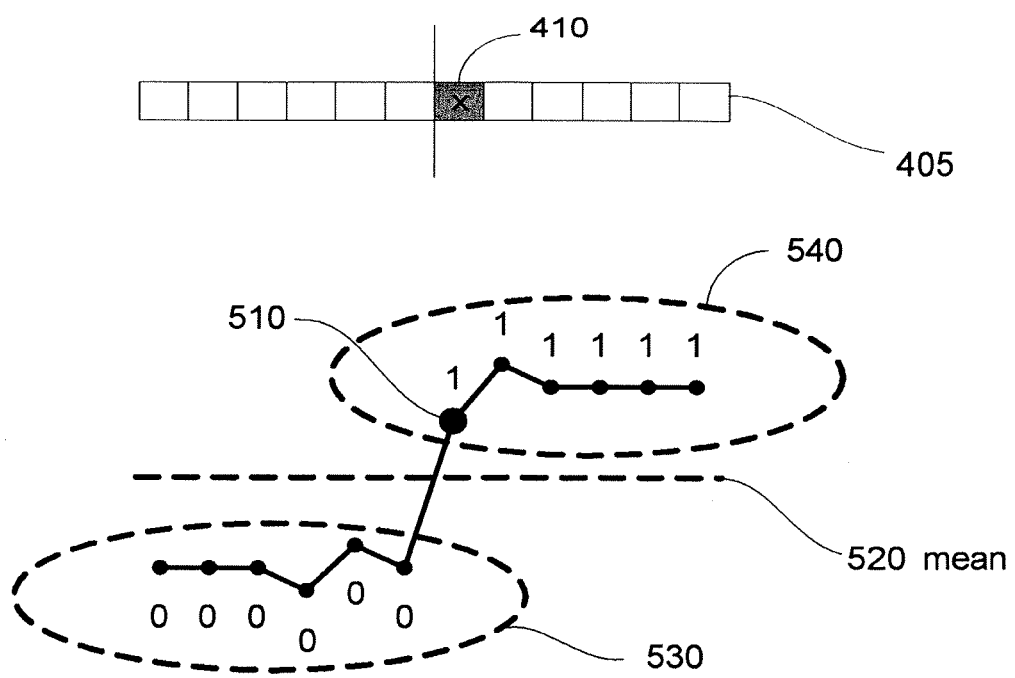
FIG. 5 is a schematic illustrating an example of pixel bisection that can be performed on the extracted set of pixels.
Figure 6:
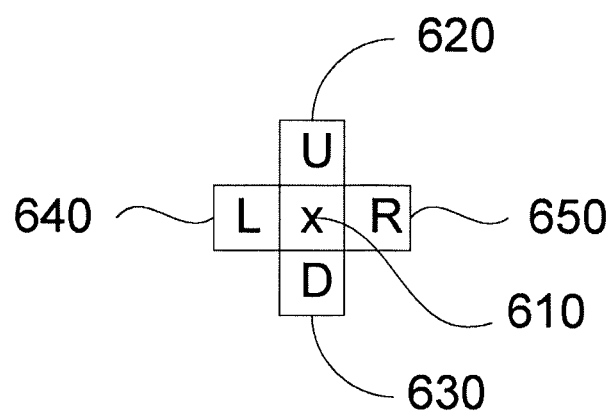
FIG. 6 is a schematic illustrating an example of binary filtering of a current pixel with its neighboring pixels.
Figure 7:
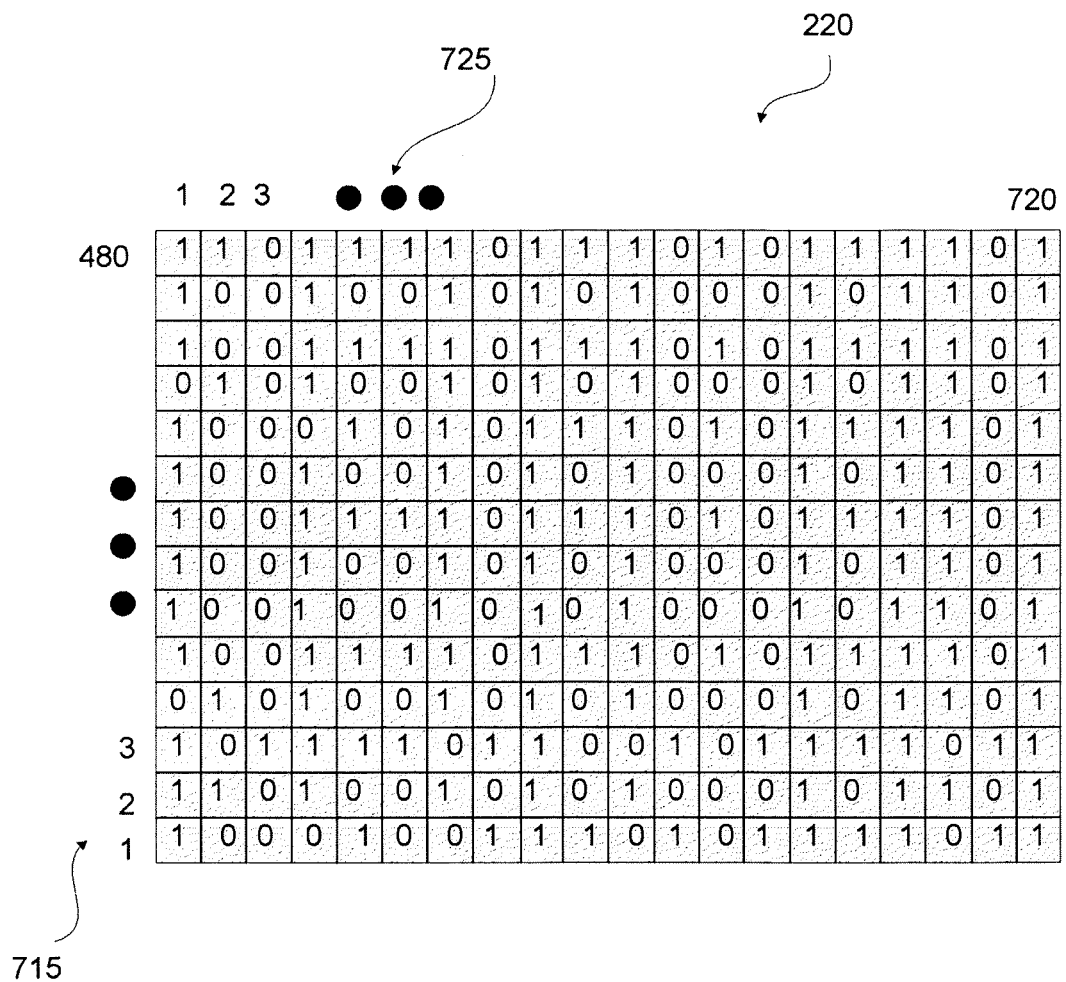
FIG. 7 is a schematic illustrating an example of a block map made by the block edge map generator illustrated in FIG. 2.

FIG. 5 illustrates one embodiment of determining block edges. The block edge map generator 230 can determine the mean 520 of the pixels in the extracted set of pixels 405. Then, a bisection indicator is assigned to each pixel based on whether or not the pixel value for that particular pixel is above ("1") or below ("0") the mean 520, thus forming pixel groups 540 and 530, respectively. A binary decision can be made whether the set of pixels is block edge or not depending on if the extracted set of pixels 405 are deemed to be "bisected," and each considered pixel is assigned an appropriate identifier (IS_BLK_EDGE or NOT_BLK_EDGE) accordingly. A similar procedure can be used for determining vertical block edges. This processing can continue until each pixel in the input image 205 is considered and assigned an appropriate identifier based on the three above-stated conditions. Then, the block edge map generator 230 can refine the assignment of the IS_BLK_EDGE indicators based on identifiers of each pixel 610 and its four pixel neighbors 620, 630, 640, 650 (FIG. 6). The block edge map generator 230 then may form a block map 220 (FIG. 7) based on the IS_BLK_EDGE ("1") and NOT_BLK_EDGE ("0") identifiers.

Figure 8A:
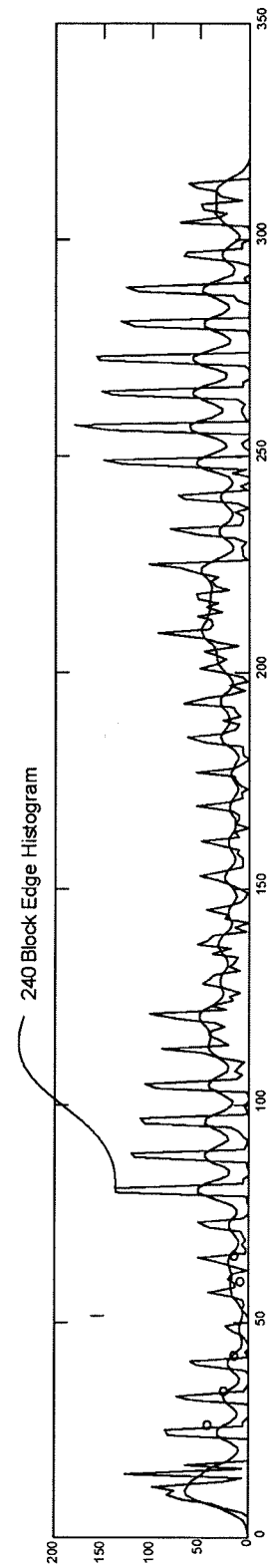
FIG. 8A is a graph illustrating an example of a block edge histogram.
Figure 8B:
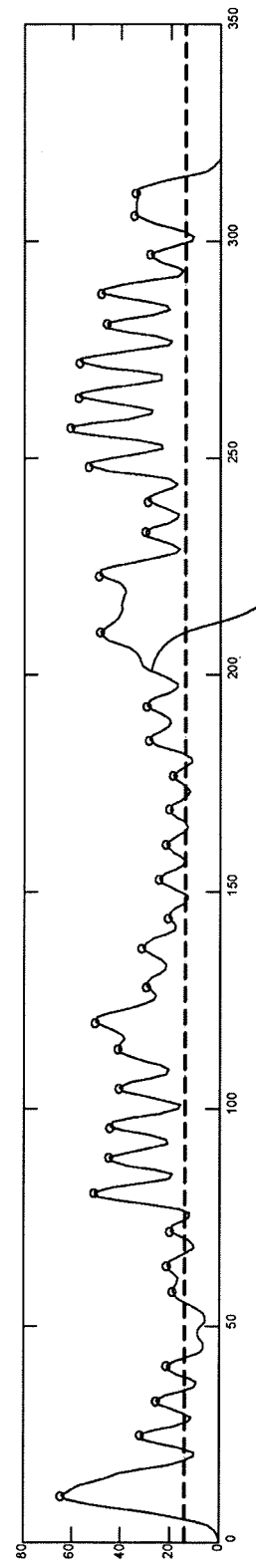
FIG. 8B is a graph illustrating an example of a filtered block edge histogram.

When the block edge locator 120 performs horizontal block edge location, the histogram generator 230 can accumulate the identifiers (e.g., 0: NOT_BLK_EDGE, 1: IS_BLK_EDGE) of block map 220 vertically to form a 1-D block edge histogram 240, along the horizontal direction of the block map 220. Similarly, when the block edge locator 110 performs vertical block edge location, the histogram generator 230 can accumulate the identifiers of block map 220 horizontally to form a 1-D block edge histogram along the vertical direction of the block map 220. FIG. 8A illustrates an example of a portion of a resulting block edge histogram 240 formed along the horizontal direction of the block map 220. A filtering component 250 (FIG. 2) can apply a low-pass filter to the block edge histogram 240, removing many of the spurious peaks apparent in the block edge histogram 240 forming a filtered block edge histogram 260 (FIG. 8B). A peak locator 270 (FIG. 2) determines the locations (index) of the peaks 280 in the filtered block edge histogram 260 and provides the peak index to a peak refiner 290. The peak refiner 290 refines the location of the peaks based on the peak index 280 and the block edge histogram 240. In FIG. 8B, the marks 'o' on the filtered block edge histogram graph 260 illustrate the peak locations that were identified using the peak locator 270 followed by using the peak refiner 290. The "block locations" indicated by the refined peak locations can be passed as block locations to the deblocking filter 120 and to the Q-value estimator 130. One embodiment of generating a block map and block edge locations is further described in co-owned application U.S. application Ser. No. 12/396,877, filed on Mar. 3, 2009, which is incorporated by reference in its entirety.

As illustrated in FIG. 1, the Q-value estimator 130 receives the block map, the block locations, and the current image. These block map and block locations are used inside the Q-value estimator 130 as a mask to pick which pixel location will be used for estimating Q-Value. The Q-value can be estimated globally (e.g., for the whole current image) or regionally for some portion or area of interest of the image. Except for taking into account the size of the particular area of interest, regional and global Q-value processing can be performed similarly. A global Q-value calculation takes the whole image as the area of interest, while a regional Q-value estimate takes a portion of the image (e.g., a specific region of the image) as an area of interest. This is graphically illustrated in FIG. 9, which shows an example of sixteen regions (e.g., 4×4 regions) which could be used for regional Q-value estimation. Alternatively, all of the regions could be used for global Q-value estimation. The Q-value is a direction dependent metric. That is, there is separate Q-value associated with the horizontal and vertical direction for an image, and they are calculated similarly. In other embodiments, the number or regions for Q-value estimation can be greater, or less than, sixteen, (for example, including but not limited to 3×3 regions, 3×4 regions, 5×5 regions, 6×6 regions). Accordingly, without loss of generality, only global Q-value estimation in the horizontal direction will be described; one of skill in the art will understand that the same calculations can be performed in the vertical direction for vertical Q-value estimation.

Figure 10:
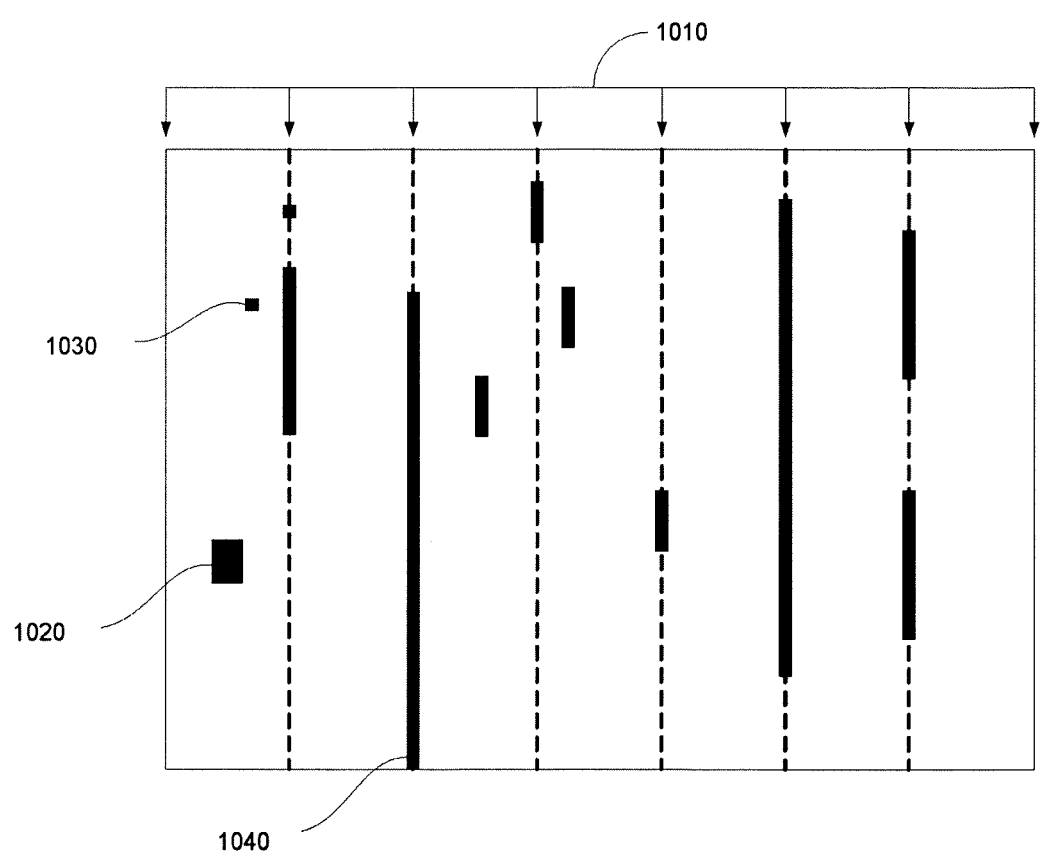
FIG. 10 is a schematic illustrating an example of a block edge map having certain block edge locations.

FIG. 10 is a schematic illustrating an example of a block map having certain block edge locations 1010 in the horizontal direction. For the binary block edge map illustrated in FIG. 10, assigned indicators that do not indicate a block edge location (e.g., NOT_BLK_EDGE) are not marked. Assigned indicators that indicate a block edge (e.g., IS_BLK_EDGE) are marked by block squares. The block locations 1010 received from the block edge locator 110 indicate which of the pixels assigned a block edge indicator are used in the Q-vale estimation. In other words, the pixel locations that contribute to a Q-value estimation can be picked based on the two signals block map and block locations, and only pixels marked in the block map as IS_BLK_EDGE (marked by black square in FIG. 10) and which are aligned with the block locations 1010 will contribute to the Q-value calculation. In FIG. 10, even though pixel locations 1020 and 1030 are assigned indicators of being a block edge (e.g., IS_BLK_EDGE), they do not align with block locations 1010 and therefore will not be used to calculate a Q-Value, in this example. Vertically aligned pixel locations 1040 are assigned a block edge indicator (e.g., IS_BLK_EDGE) and also coincides with block locations 1010, so it will be used in calculating a Q-value.

Figure 11:
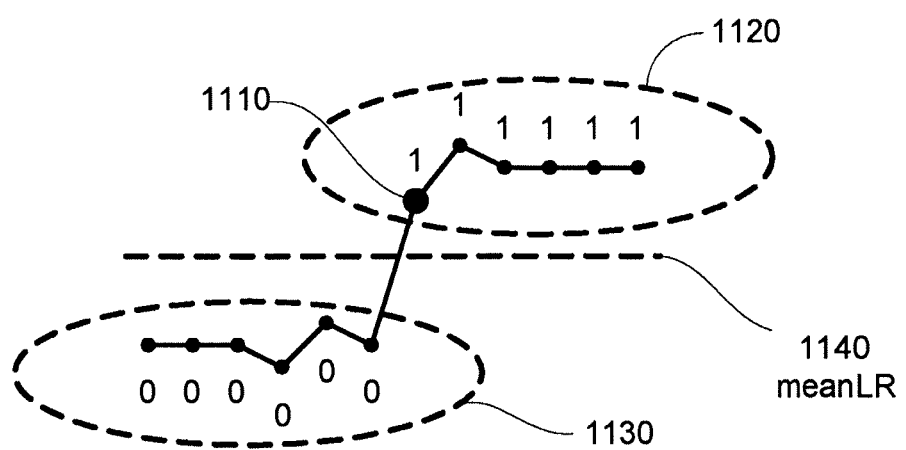
FIG. 11 is schematic illustrating a flatness level calculation.

After it is determined which "considered" pixels will be used to calculate a Q-value (e.g., have both a block edge indicator and are aligned with the block locations) a "flatness" calculation is performed for each considered pixel, and used to calculate the Q-value. FIG. 11 is schematic illustrating a flatness level calculation according to one embodiment. In FIG. 11, the calculation of Q-value at a considered pixel location 1110 is shown. For each contributed pixel for the Q-value calculation, the flatness level will be determined based on the set of pixels extracted around considered pixel 1110. In the example illustrated in FIG. 11, the set of extracted pixels consist of six (6) pixels on the left side 1130 and 5 pixels on the right side 1120. The "flatness" calculation indicates how flat (or similar) the pixels values on both the left and right sides of the considered pixel are, which is indicative of deviations of the pixel values.

According to one embodiment, flatness can be determined in accordance with the following calculations. Let v be the set of twelve extracted pixels, and vL and vR be the extracted pixels on the left and right sides of the considered pixel 1110, respectively. In some embodiments, the set of extracted pixels can be less than twelve, and in other embodiments grater than twelve. The mean is calculated for these three sets of extracted pixels: meanLR=MEAN(v): mean of all pixels in set v; meanL=MEAN(vL): mean of pixels in set v to the left of the considered pixel 1110; and meanR=MEAN(vR): mean of pixels in set v to the right of the considered pixel 1110. Then calculate the standard deviation of the left and rights sets of extracted pixels, e.g., sigmaL=STD(vL); and sigmaR=STD(vR). Count the number of sign changes ("scLR") of v based on the mean of the pixel values meanLR. The sign of each pixel in v can be defined as follows, according to one embodiment. For each pixel in v, if the pixel value is less than the mean of the pixel values in v, e.g., meanLR, its sign is set to "0;" otherwise its sign is set to "1." The number of sign changes are counted based on the change of sign from "0" to and "1" to "0." In other words, in the set of pixels v, determine how many times the sign changes for the set of pixels v, the sign changes being from "0" to "1" and "1" to "0."

Then, the "flatness" level is calculated for pixel values on the left side of the considered pixel and right side of the considered pixel 1110. The "flatness" of the pixels on the left side of the considered pixel flatL can be determined by flatL=RampCurve(32, 0, stdT1, stdT2, sigmaL). The "flatness" of the pixels on the right side of the considered pixel flatR can be determined by flatR=RampCurve(32, 0, stdT1, stdT2, sigmaR). For these calculations, the function RampCurve is defined by the relation in Equation 1 below:

$$RampCurve(A, B, T1, T2, t) = \begin{cases} A & \text{if } t < T1 \\ A + \frac{(B-A)}{(T2-T1)}t & \text{if } T1 <= t < T2 \\ B & \text{otherwise} \end{cases} \quad [\text{EQN. 1}]$$

where T1 and T2 are mean threshold values. The mean ratio (meanRatio) for a considered pixel 1110 (or block difference ratio) can be expressed by the relation in Equation 2 below:

meanRatio=RampCurve(0,32,meanT1,meanT2, |meanL−meanR|)  [EQN. 2]

The flatness level (flatLevel) for a considered pixel 1110 can then be expressed by the relation in Equation 3 below:

flatLevel=(((meanRatio*flatL*flatR)/scLR)/32)/32  [EQN. 3]

In this exemplary embodiment, the flatness level (flatLevel) for a considered pixel 1110 can depend on four factors: the mean ration (meanRatio), the flatness level on the left side (flatL) of the considered pixel 1110, the flatness level on the right side (flatR) of the considered pixel, and the number of sign changes (scLR) in the set of pixels v. The relations between these factors to the flatness level (flatLevel) are as follows: the higher the mean ration (meanRatio), the higher the flatness level (flatLevel), which indicates a blocky image. The higher the flatness of the pixels on the left (flatL) and right (flatR) of the considered pixel 1110, and the greater the number of sign changes (scLR), the lower the flatness level (flatLevel), which is indicative of a non-blocky image. To calculate the Q-value for the entire region or image, the flatness level (flatLevel) for every considered pixel is determined, and the average flatness value is calculated and used as the Q-value for the particular region or image of interest. The Q-value estimator 130 provides the (final) Q-value to the deblocking filter 140.

Figure 12:
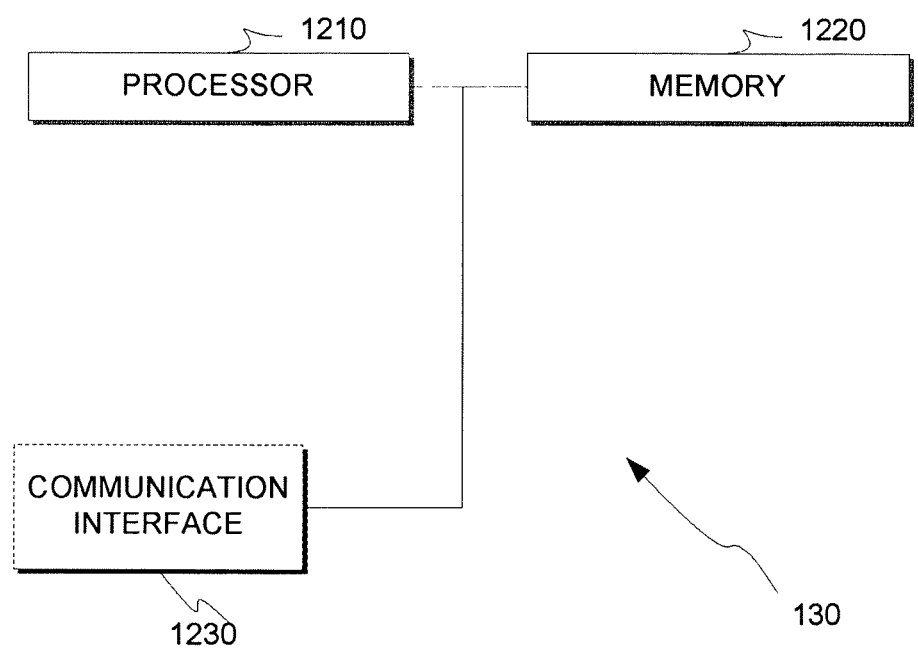
FIG. 12 is a schematic illustrating components one embodiment of a Q-value estimator, according to one embodiment.

FIG. 12 is a block diagram illustrating components of one embodiment of a Q-value estimator 130 (FIG. 1). In some embodiments, the Q-value estimator 130 can be implemented separately from the other components illustrated in FIG. 1 (e.g., the block edge map generator 110, the block edge locator 120, or the deblocking filter 140). In other embodiments, the Q-value estimator 130 and one or more of the block edge map generator 110, the block edge locator 120, and the deblocking filter 140 can be implemented on the same processor(s), or in the same device. In some embodiments, the Q-value estimator 130 is included in a television (or a display device), or included in a component (e.g., a CATV box or a satellite communication box) that receives video data and communicates the video data to a display device. The Q-value estimator 130 can include a communication interface 1230 to receive image information from upstream video processing (e.g., a block edge map generator 110 and a block edge locator 120) and to send Q-values to downstream video processing components, for example, a deblocking filter 140 (FIG. 1). A processor 1210 may communicate with the communication interface 1230 and with a memory 1220. The processor 1210 may be configured to perform the various functions associated with locating block edges, including but not limited to receiving video data, block edge map generation, histogram generation, filtering, peak location, peak refinement, and generating and providing block locations. In one embodiment, the memory 1220 includes an instruction storage medium having instructions (or data indicative of such instructions where the instructions are stored in compressed or encrypted form) that causes the processor 1210 to perform functions associated with the Q-value estimator 130.

Figure 13:
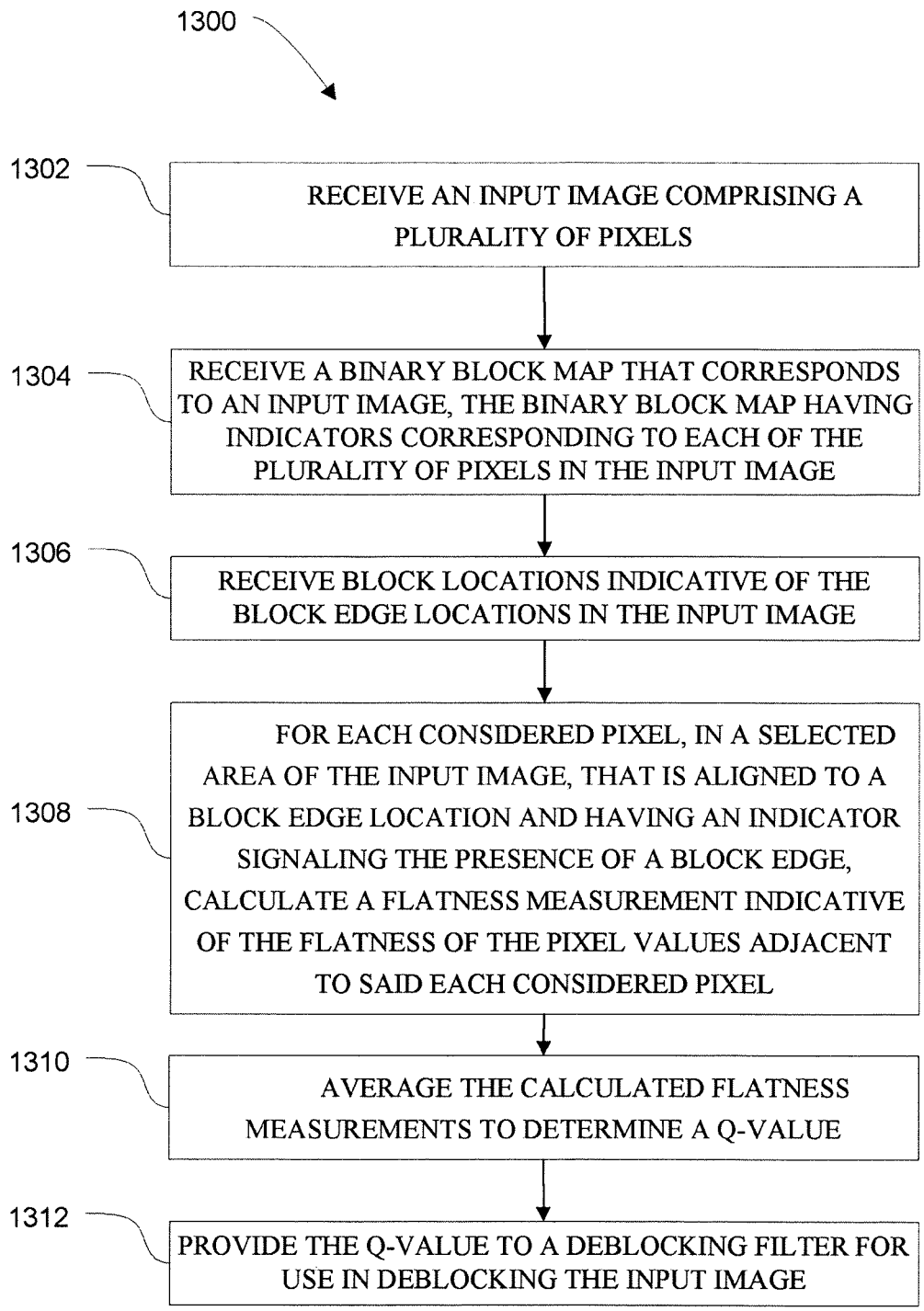
FIG. 13 is a flowchart illustrating a method of determining a Q-value according to one embodiment.

FIG. 13 illustrates a process 1300 that can determine a Q-value for a particular area of interest in an image. At step 1302, an input image comprising a plurality of pixels is received, for example, by the Q-value estimator 130 (FIG. 1). At step 1304, a binary block map is received. The block map corresponds to the input image and has indicators corresponding to each of the plurality of pixels in the input image, each indicator signaling if a block edge is present at the corresponding pixel location in the input image. The Q-value estimator 130 can also perform this step. At step 1306, the process 1300 receives block locations indicative of the alignment block edge locations in the input image. Again, the Q-value estimator 130 can be configured to perform this step. At step 1308, for each considered pixel, in a selected area of the input image, that is aligned to a block edge location and having an indicator signaling the presence of a block edge, the process 1300 calculates a flatness measurement indicative of the flatness of the pixel values adjacent to said each considered pixel. This can be done by the Q-value estimator 130, for example, as described in reference to FIGS. 9-11 (above). Next at step 1310, the process 1300 averages the calculated flatness measurements to determine a Q-value, the Q-value indicative of the blockiness level of the input image selected area. This can be performed by the Q-value estimator 130 as described above in reference to FIG. 11 and Equations 1-3 and corresponding text. Finally the process 1300 provides the Q-value to a deblocking filter for use in deblocking the input image (e.g., for example, as illustrated in FIG. 1).

It is recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of determining a blockiness level of an image, comprising:
   receiving an input image having pixels;
   receiving a binary block map corresponding to the input image, the binary block map having indicators corresponding to a pixel in the input image, each indicator signaling whether a block edge is present at a location of the corresponding pixel in the input image;
   receiving block locations indicative of a block edge location in the input image;
   for each considered pixel, in a selected area of the input image, aligned to the block edge location and, having an indicator signaling the presence of the block edge, calculating a flatness measurement indicative of a flatness of the pixel values of the adjacent pixels to said each considered pixel based on a sign change count of the adjacent pixel value from a mean calculated for all the pixel values in a set; and
   averaging calculated flatness measurements to determine a Q-value, the Q-value indicative of the blockiness level of the input image selected area, for deblocking the input image.

2. The method of claim 1, wherein:
   receiving the binary block map includes receiving the binary block map having an indicator signaling whether the block edge is present at the corresponding pixel location in the input image in a first direction;
   receiving the block locations includes receiving the block locations indicative of the block edge location in the input image in the first direction;
   calculating the flatness measurement includes calculating the flatness measurement indicative of the flatness of the pixel values adjacent to said each pixel in the first direction; and
   determining the Q-value includes determining the Q-value indicative of the blockiness level of the selected area in a first direction.

3. The method of claim 2, wherein the first direction is horizontal with respect to the input image.

4. The method of claim 2, wherein the first direction is vertical with respect to the input image.

5. The method of claim 1, wherein the selected area includes the entire input image.

6. The method of claim 1, wherein the selected area includes a portion of the input image.

7. The method of claim 1, further comprising determining two or more regions of interest in the input image, calculating the Q-value for each of the two or more regions, and providing the Q-value for each of the two or more regions.

8. The method of claim 1, wherein calculating the flatness measurement for each considered pixel includes extracting a set of pixels on opposite sides of the considered pixel forming a set of at least seven pixels, and calculating the flatness measurement based on the pixels values for the set of at least seven pixels.

9. The method of claim 1, wherein calculating the flatness measurement for each considered pixel includes extracting a set of pixels on opposite sides of the considered pixel forming a set of at least twelve pixels, and calculating the flatness measurement based on the pixels values for the set of at least twelve pixels.

10. A deblocking system, comprising:
a block edge map generator configured to generate a block map of an input image, the block map comprising indicators corresponding to each pixel in the input image, the indicators signaling whether a block edge exists at a location of the corresponding pixel location in a first direction;
a block edge locator configured to generate a block edge location for blocks in the input image in a first direction; and
a Q-value estimator configured to receive the block map and block locations, for generating a Q-value indicative of the blockiness of the input image in the first direction based on the block map and the block locations by calculating an average of flatness measurements indicative of a flatness of the pixel values of the adjacent pixels to said each considered pixel based on a sign change count of the adjacent pixel value from a mean calculated for all the pixel values in a set, and for providing the Q-value for deblocking the input image.

11. The system of claim 10, further comprising a deblocking filter configured to receive the Q-value, the block locations and the input image, and perform deblocking on the input image based on the block locations and the Q-value.

12. A non-transitory computer-program product for locating block edges in an image, the product comprising:
a computer-readable medium having stored thereon codes executable by at least one processor to:
receive an input image comprising pixels;
receive a binary block map corresponding to the input image, the binary block map having an indicator corresponding to a pixel in the input image, each indicator signaling whether a block edge is present at a location of the corresponding pixel location in the input image;
receive block locations indicative of a block edge location in the input image;
for each considered pixel, in a selected area of the input image, aligned to a block edge location and having an indicator signaling the presence of the block edge, calculate a flatness measurement indicative of a flatness of the pixel values of the adjacent pixels to said each considered pixel based on a sign change count of the adjacent pixel value from a mean calculated for all the pixel values in a set;
average calculated flatness measurements to determine a Q-value, the Q-value indicative of the blockiness level of the input image selected area, for deblocking the input image.

13. A system for locating block edges in an image, comprising:
a block edge map generator for receiving an input image comprising pixels;
a block edge locator, coupled to the block edge map generator, for receiving a binary block map corresponding to the input image, the binary block map having an indicator corresponding to a pixel in the input image, each indicator signaling whether a block edge is present at a location of the corresponding pixel location in the input image;
a deblocking filter, coupled to the block edge locator, for receiving block locations indicative of a block edge location in the input image;
for each considered pixel, in a selected area of the input image, aligned to a block edge location and having an indicator signaling the presence of the block edge, a Q-value estimator, coupled to the deblocking filter, for calculating a flatness measurement indicative of a flatness of the pixel values of the adjacent pixels to said each considered pixel based on a sign change count of the adjacent pixel value from a mean calculated for all the pixel values in a set;
a processor, coupled to the Q-value estimator, for averaging calculated flatness measurements to determine a Q-value, the Q-value indicative of the blockiness level of the input image selected area; and
a communication interface, coupled to the processor, for providing the Q-value to a deblocking filter for deblocking the input image.

14. The system of claim 13, wherein:
the block edge locator is for receiving the binary block map having an indicator signaling whether the block edge is present at the corresponding pixel location in the input image in a first direction;
the deblocking filter is for receiving the block locations indicative of the block edge location in the input image in the first direction;
the Q-value estimator is for calculating the flatness measurement indicative of the flatness of the pixel values adjacent to said each pixel in the first direction; and
the processor is for determining the Q-value indicative of the blockiness level of the selected area in a first direction.

15. The system of claim 14, wherein the first direction is horizontal with respect to the input image.

16. The system of claim 14, wherein the first direction is vertical with respect to the input image.

17. The system of claim 13, wherein the selected area includes the entire input image.

18. The system of claim 13, wherein the selected area includes a portion of the input image.

19. The system of claim 13, wherein:
the processor is for determining the Q-value for two or more regions of interest in the input image; and
the communication interface is for providing the Q-values for each of the two or more regions.

20. The system of claim 13, wherein the processor is configured to, for each considered pixel, extract a set of pixels on opposite sides of the considered pixel and calculate the flatness measurement based on pixels values of the extracted set of pixels.

* * * * *